(12) United States Patent
Nam et al.

(10) Patent No.: US 8,389,144 B2
(45) Date of Patent: Mar. 5, 2013

(54) RESERVE BATTERY HAVING ALL SOLID STATE THIN FILM BATTERY

(75) Inventors: Sang-Cheol Nam, Seoul (KR); Ho-Young Park, Seoul (KR); Young-Chang Lim, Gyeonggi-do (KR); Kyu-Gil Choi, Seoul (KR); Ki-Chang Lee, Seoul (KR); Gi-Back Park, Incheon (KR); Jae-Bum Kim, Seoul (KR)

(73) Assignee: GS Nanotech Co., Ltd., Seoul (KR)

( * ) Notice: Subject to any disclaimer, the term of this patent is extended or adjusted under 35 U.S.C. 154(b) by 1116 days.

(21) Appl. No.: 12/308,213

(22) PCT Filed: Jul. 12, 2006

(86) PCT No.: PCT/KR2006/002746
§ 371 (c)(1),
(2), (4) Date: Dec. 9, 2008

(87) PCT Pub. No.: WO2007/145392
PCT Pub. Date: Dec. 21, 2007

(65) Prior Publication Data
US 2009/0162743 A1   Jun. 25, 2009

(30) Foreign Application Priority Data

Jun. 13, 2006 (KR) .................. 10-2006-0053187

(51) Int. Cl.
*H01M 6/30* (2006.01)

(52) U.S. Cl. ........................................ 429/110; 429/163
(58) Field of Classification Search .................. None
See application file for complete search history.

(56) References Cited

U.S. PATENT DOCUMENTS

| | | | |
|---|---|---|---|
| 3,664,875 A * | 5/1972 | Graf | 429/54 |
| 4,446,211 A * | 5/1984 | Goebel et al. | 429/101 |
| 5,919,589 A * | 7/1999 | Kawakami et al. | 429/231.8 |
| 6,183,905 B1 * | 2/2001 | Ling | 429/181 |
| 6,475,662 B1 * | 11/2002 | Spencer | 429/112 |
| 2003/0024994 A1 | 2/2003 | Ladyansky | |

FOREIGN PATENT DOCUMENTS

| | | |
|---|---|---|
| DE | 10038066 A1 | 3/2002 |
| WO | WO-00/22685 A1 | 4/2000 |
| WO | WO-03/073531 A2 | 9/2003 |

* cited by examiner

*Primary Examiner* — Cynthia Lee
(74) *Attorney, Agent, or Firm* — Edwards Wildman Palmer LLP; Peter C. Schechter; Steven M. Jensen (57) ABSTRACT

The present invention discloses a reserve battery having an all solid state thin film battery (5). The reserve battery includes: a housing (1) made of a conductive material; an insulation coating (2) formed on the inner surface of the housing (1); an all solid state thin film battery formed in the housing; a switching System (3) disposed between the housing (1) and the all solid state thin film battery; and an external (6) terminal electrically connected to the all solid state thin film battery, for externally providing electrical connection through the opened surface of the housing. The reserve battery overcomes disadvantages of a general reserve battery using an electrolyte solution.

31 Claims, 5 Drawing Sheets

Fig. 12

RESERVE BATTERY HAVING ALL SOLID STATE THIN FILM BATTERY

CROSS-REFERENCE TO RELATED APPLICATIONS

This application is the National Stage of PCT/KR2006/002746, filed Jul. 12, 2006, which claims benefit of Korean Application 10-2006-0053187, filed Jun. 13, 2006. The entire contents of each of these applications is incorporated herein by reference.

TECHNICAL FIELD

The present invention relates to a reserve battery having an all solid state thin film battery, and more particularly, to a reserve battery activated by using an external physical stimulus, especially, a set back force, by using a thin film battery having solid state electrolytes and active materials. The reserve battery is used when a high output is required in a short time, for example, for a cracker, a model rocket, a small-sized rocket and a firework. Especially, the reserve battery can be used to induce explosion of a fuse as a power source operated by a set back force generated in percussion of a personal firearm and other firearms.

BACKGROUND ART

As one example of the reserve battery, the battery for the fuse which induces explosion must have a relatively high voltage over 3.0V in use, endure short time discharge having 10 kΩ of load over about 30 seconds, and have a very small diameter of a few mm and a very small weight according to the property of the fuse for the personal firearm. In addition, the battery includes a switch operated by a set back force of about 30,000 G. The rising time of the battery after the operation of the switch must be equal to or shorter than 1 msec.

DISCLOSURE OF INVENTION

Technical Problem

Most of batteries for fuses suggested in the conventional art are reserve batteries. Normally, in the reserve battery, an electrolyte solution is contained in a glass ampoule and metal electrodes are installed outside the glass ampoule. The glass ampoule is destroyed by a set back force generated in percussion, so that the electrolytes and the metal electrodes can contact each other to generate electricity. Although the reserve battery is preserved for an extended period of time, the reserve battery is nothing but an inactive battery. That is, the property of the battery can be checked merely by contacting the electrolyte solution and both electrodes by destroying the glass ampoule. In addition, the reserve battery requires the time for inducing current by contacting the electrolyte solution to both electrodes by destroying the glass ampoule, namely, the rising time. The battery for the fuse for the personal firearm has a very small size of about φ5×4.5 mm. The preparation process of the reserve battery is complicated due to the bulk state material property and the electrolyte solution injected into the glass ampoule. Accordingly, the reserve battery is not suitable for mass production. Furthermore, SOCl$_2$ used as a liquid electrolyte solution shows strong toxicity, which may cause problems to the environment and reduce safety.

Technical Solution

The present invention is achieved to solve the above problems. An object of the present invention is to provide a reserve battery which can be activated by an external stimulus in a short rising time and whose reliability (activation) can be checked in advance.

Another object of the present invention is to provide a structure of increasing a capacity or voltage of a reserve battery by connecting unit cells of the reserve battery in parallel, in series or in parallel and series.

In order to achieve the above-described objects of the invention, there is provided a reserve battery having an all solid state thin film battery, including: a housing made of a conductive material; an insulation coating formed on the inner surface of the housing; an all solid state thin film battery formed in the housing; a switching system disposed between the housing bottom and the all solid state thin film battery; and an external terminal electrically connected to the all solid state thin film battery, for externally providing electrical connection through the opened surface of the housing.

Preferably, the switching system is an insulator having a perforated center, and provides electrical connection between the housing and the all solid state thin film battery by a physical stimulus applied from the outside of the housing.

Preferably, the bottom part of the housing on which the insulation coating has not been formed is sunk by an external pressure, protruded to the perforated region of the switching system, and electrically connected to the thin film battery, thereby activating the reserve battery. In addition, the switching system is formed in various thickness to decide the minimum external pressure for activating the reserve battery.

Preferably, the switching system further includes a conductive safety structure in a space with the all solid state thin film battery, for protecting the all solid state thin film battery from the physical stimulus applied to the housing. Also, the safety structure further includes a conductive coating layer on its surface directly contacting an electrode of the all solid state thin film battery, for restricting reactivity with the contact electrode of the all solid state thin film battery.

Preferably, the reserve battery further includes a molding member for closing the opened surface of the housing on which the external terminal has been formed. The molding member is made of a material for preventing moisture and oxygen from mixing into the reserve battery. Preferably, the reserve battery further includes a structure having a perforated center between the molding member and the external terminal.

Preferably, the reserve battery further includes a sealing member for sealing up the opened surface of the housing. The sealing member includes an outer cap bonded to the housing, a conductive inner cap adhered to the external terminal, and an insulating film formed between the outer cap and the inner cap. Especially, the outer cap is bonded to the housing by laser welding, and the outer cap and the housing are made of the same material. Preferably, the outer cap and the housing include a nickel plating film or are made of stainless steel, for improving welding efficiency by minimizing reflexibility in the laser welding. Preferably, the inner cap is adhered to the external terminal by a conductive adhesive, has a minute hole on its upper direction, and further includes a conductive wire inserted into the minute hole and compressed.

Preferably, the all solid state thin film battery includes a conductive substrate, a current collector deposited on the substrate, an cathode, a solid electrolyte and a anode, which are sequentially formed. The all solid state thin film battery further includes a thermal diffusion barrier film between the substrate and the current collector. Preferably, the thermal diffusion barrier film is indiume tin oxide (ITO) or cobalt.

Preferably, the reserve battery includes at least two all solid state thin film batteries in the housing. The all solid state thin film batteries are connected in parallel by an insulating film structure formed between the thin film batteries, a member for contacting cathodes, and a member for contacting anodes.

Preferably, the reserve battery includes at least two all solid state thin film batteries in the housing. The all solid state thin film batteries are connected in series by being stacked in a certain direction so that cathodes can be positioned at the upper direction and anodes can be positioned at the lower direction.

Preferably, the reserve battery includes at least three all solid state thin film batteries in the housing. The all solid state thin film batteries are connected in series and parallel. The reserve battery includes at least two modules formed by stacking at least two all solid state thin film batteries in series in a certain direction so that cathodes can be positioned at the upper direction and anodes can be positioned at the lower direction. The modules are connected in parallel by an insulating film structure, a member for contacting cathodes, and a member for contacting anodes.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A reserve battery having an all solid state thin film battery in accordance with preferred embodiments of the present invention will now be described in detail with reference to the accompanying drawings.

Differently from the general reserve batteries, the reserve battery using the all solid state thin film battery does not use an electrolyte solution. The electrolyte solution shows excellent ion conductivity but is not preserved for a long time due to self discharge. Therefore, the electrolyte solution is contained in a glass ampoule. Also, the electrolyte solution is not good for the environment. When preserved in the ampoule for a long time, the electrolyte solution is leaked to cause corrosion in the battery. The structure of the battery is complicated by adopting the ampoule. Although the all solid state thin film battery has lower ion conductivity than the liquid electrolyte, the all solid state thin film battery is suitable for long time preservation due to little self discharge. Moreover, the inside structure of the all solid state thin film battery can be simplified by omitting the electrolyte solution.

In the case of the reserve battery, in an internal switching system, a time for diffusing the electrolyte solution contained in the ampoule is necessary in activation, and leakage of the electrolyte solution is generated in long time preservation. However, since polyimide or similar substance having a thickness of a few tens microns to a few hundreds microns is used as an insulating film, corrosion is not generated in long time preservation and the rising time is shortened.

A housing which is a current collector composing the external appearance is made of a conductor, but efficiently insulates a cathode and an anode by very thin special coating. When using a metal housing, the general reserve batteries adopt a double housing structure, which decreases an inside space and increases manufacturing expenses. In accordance with the present invention, a few tens microns of insulation coating is evenly minutely coated on the inner wall of the housing, thereby removing electrical shortage of the cathode and the anode. A structure having a perforated center on the cathode current collector restricts reaction between lithium of the all solid state thin film battery which is easily oxidized and molding members, by preventing inflow of the molding members. In addition, the structure prevents the insulating coating from falling off by restricting friction of a cap and the housing.

The molding members protect materials of the battery which are very weak to moisture. Epoxy and ceramic materials are used as the molding members for intercepting moisture and oxygen. For example, ceramic materials such as a ceramic mixture of a resin material of magnesium silicate hydrated and epoxy resin and a hardener containing silica, magnesium silicate hydrate, diethylenetriamine and epoxy resin show more excellent moisture prevention than epoxy materials. In a state where the battery is put inside, it is difficult to perform a general glass-metal bonding process which applies much heat in bonding. However, hardening is proceeded at the normal temperature by using the epoxy or ceramic materials. Also, it has advantages of hardening is proceeded at the normal temperature by using the epoxy or ceramic materials.

The reserve battery will now be explained with reference to FIG. 1. A housing 1 made of a conductive material such as copper, nickel and stainless steel composes the external appearance. One surface of the housing 1 is opened and the other surfaces thereof are closed. The housing 1 serves as a current collector. A very thin insulation coating 2 is formed on the inner surface of the housing 1, for efficiently insulating a cathode and an anode. The insulation coating 2 is formed at a thickness of 8 to 30 mm by using parylene. Part of the closed surface of the housing 1 is masking-processed so that the insulation coating 2 cannot be formed thereon. Therefore, a current flows through the housing 1 in activation. An all solid state thin film battery 5 is disposed in the housing 1. A switching system 3 is provided between the housing 1 and the all solid state thin film battery 5. The switching system 3 maintains the reserve battery in an inactive structure and activates the reserve battery in certain conditions. In addition, the reserve battery includes an external terminal 6 contacting the all solid state thin film battery 5 and providing external electrical connection through the opened surface of the housing 1.

Figure 3:
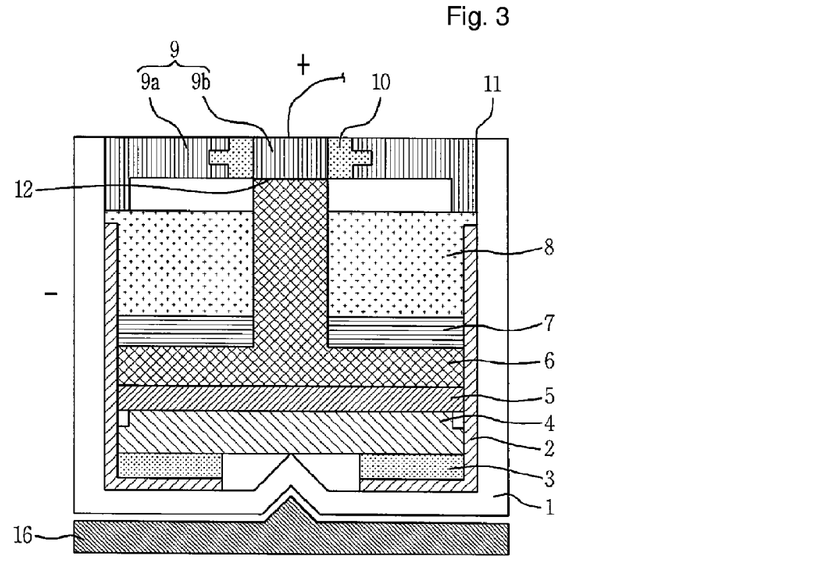
FIG. 3 is a cross-sectional view illustrating an activation process of the reserve battery having the all solid state thin film battery in accordance with the present invention.

Preferably, the switching system 3 is an insulator having a perforated center and a thickness of 0.1 to 0.3 mm (donut shape). When an external physical stimulus is applied to the housing 1, the housing 1 is inwardly protruded through the perforated region and contacts the all solid state thin film battery 5. As shown in FIG. 3, an external sinking structure 16 is used to apply a set back force to the housing 1, thereby composing the electrical connection.

When the thickness of the switching system 3 is changed, the height of the housing 1 that must be protruded to contact the all solid state thin film battery 5 is changed. Therefore, the minimum external pressure for activating the reserve battery is controlled according to the thickness of the switching system 3. Preferably, the switching system 3 includes a conductive safety structure 4. When the housing 1 is protruded by the external pressure in the activation process of the reserve battery, the impact may be transmitted directly to the all solid state thin film battery 5. Here, the safety structure 4 prevents damages of the all solid state thin film battery 5 and stably contacts the housing 1 and the all solid state thin film battery 5. The safety structure 4 is made of a conductive metal material such as copper, nickel and stainless steel. When the safety structure 4 is made of a metal material such as nickel and stainless steel, since the cathode of the all solid state thin film battery 5 is made of a lithium thin film, the surface of the safety structure 4 directly contacting the cathode of the all solid state thin film battery 5 can further include a conductive coating layer having low reactivity with lithium. The coating layer can be formed by using copper. Preferably, the safety structure 4 is designed to prevent battery short by contact to the cathode of the all solid state thin film battery 5 operated as a substrate, by slightly reducing the area contacting the all solid state thin film battery 5.

In addition, the reserve battery further includes a molding member 8 for closing the opened surface of the housing 1 on which the external terminal 6 has been formed. Preferably, the molding member 8 is made of a material which can protect the materials inside the all solid state thin film battery 5 very weak to moisture or air. Especially, epoxy materials and ceramic materials can be used. Here, the ceramic materials show more excellent moisture and air interception effects than the epoxy materials. For example, a ceramic mixture of a resin material of magnesium silicate hydrated and epoxy resin and a hardener containing silica, magnesium silicate hydrate, diethylenetriamine and epoxy resin is preferably used. The ceramic material such as Torr-seal (varian) or VS-101 (Huntington) is preferably used. Since hardening is proceeded at the normal temperature by the epoxy or ceramic materials, the molding process can be carried out in the final assembly state of the battery.

Preferably, a structure 7 having a perforated center like an O-ring is installed at the upper direction of the external terminal 6, for preventing the molding member 8 from reaching the insertion position of the all solid state thin film battery 5 at an early stage.

Figure 2:
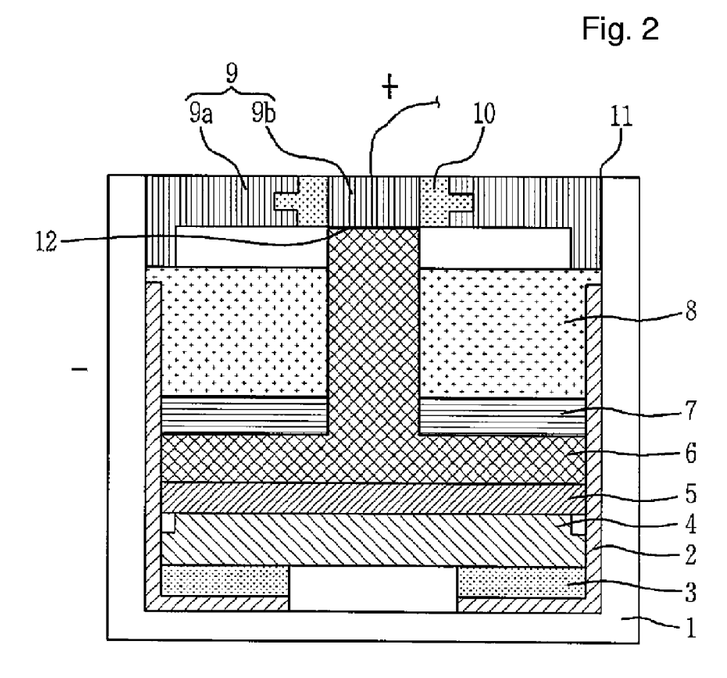

Referring to FIG. 2, a conductive sealing member 9 is mounted on the molding member 8 to maximize the long time preservation property of the reserve battery having the all solid state thin film battery 5. The sealing member 9 includes an outer cap 9a and an inner cap 9b. A glass insulating film 10 is inserted between the outer cap 9a and the inner cap 9b. The sealing member 9 prevents short of the reserve battery by contact of the housing 1 and the external terminal 6. The outer cap 9a completely seals up the housing 1 by laser welding 11. The sealing member 9 prevents the rising temperature in the welding from being transmitted to the lower direction to deteriorate the all solid state thin film battery 5. Preferably, the housing 1 and the outer cap 9a are made of the same material for laser welding. When the housing 1 and the outer cap 9a are made of a metal material such as copper, 5 to 10 mm of nickel plating is preferably formed to minimize laser reflexibility. Also, the housing 1 can be made of stainless steel instead of copper.

The inner cap 9b and the external terminal 6 are electrically connected through a conductive adhesive 12. Here, a minute hole is formed at the upper direction of the inner cap 9b which is a current collector, and a copper wire 15 is inserted into the minute hole and compressed. As compared with a simple soldering process for soldering the copper wire 15 onto the inner cap 9b, a bonding force is improved to obtain stability. In the case that the reserve battery is used as a fuse auxiliary power source, a predetermined pressure must be applied from the upper direction in battery assembly to resist strong rotation. The sealing member 9 stabilizes bonding of the battery and the current collectors by evenly distributing the pressure applied from the upper direction.

Figure 4:
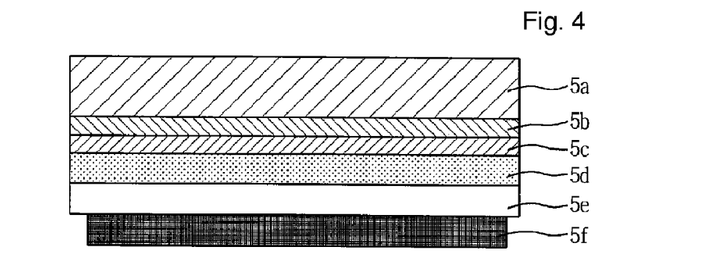
FIG. 4 is a typical view illustrating the structure of the all solid state thin film battery in accordance with the present invention.

FIG. 4 is a typical view illustrating the all solid state thin film battery 5 provided in the housing 1. The all solid state thin film battery 5 includes an cathode current collector 5c deposited on a metal substrate 5a, an cathode 5d, a solid electrolyte Se and a anode 5f, which are sequentially formed. The detailed structure of the all solid state thin film battery 5 has been described in Korea Patent Application No. 102005-0043546. The cathode 5d is lithium cobalt oxide, lithium manganese oxide or lithium nickel oxide, the solid electrolyte Se is lithium phosphorous oxynitride (LIPON) prepared by substituting some nitrogen in lithium phosphorous oxide, and the anode 5f is metal lithium prepared by vacuum thermal deposition. Here, a thermal treatment is needed for crystallization of the cathode 5d. Preferably, the all solid state thin film battery 5 further includes a conductive thermal diffusion barrier film 5b for preventing the metal substrate material used as a substrate in the cathode thermal treatment from being thermally diffused into the cathode 5d at a high temperature. Preferably, ITO is inserted as the thermal diffusion barrier film 5b. More preferably, instead of ITO, cobalt can be used as an interlayer adhering layer for preventing separation of the active material thin film of the all solid state thin film battery 5 by the external stimulus. Such separation may be generated when the all solid state thin film battery 5 is inserted into the housing 1 and activated by the external stimulus.

Figure 1:
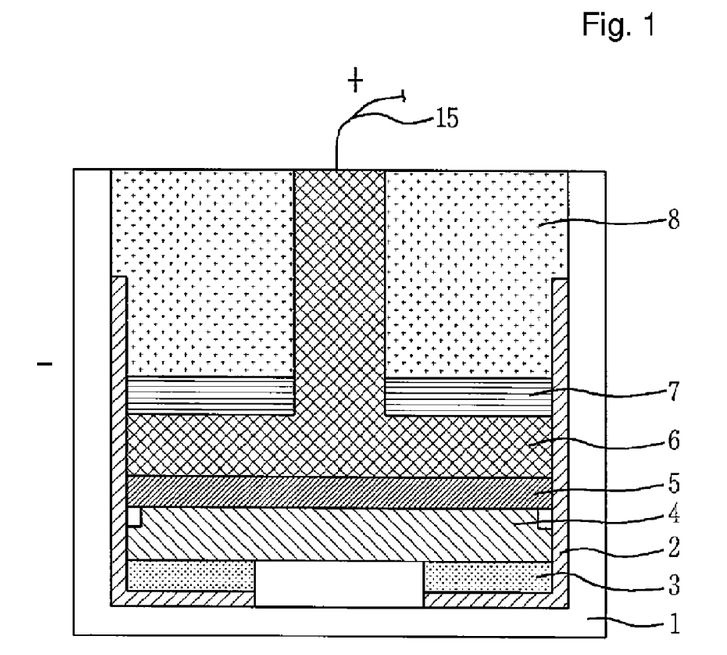
FIGS. 1 and 2 are cross-sectional views illustrating a reserve battery having an all solid state thin film battery in accordance with the present invention.
Figure 7:
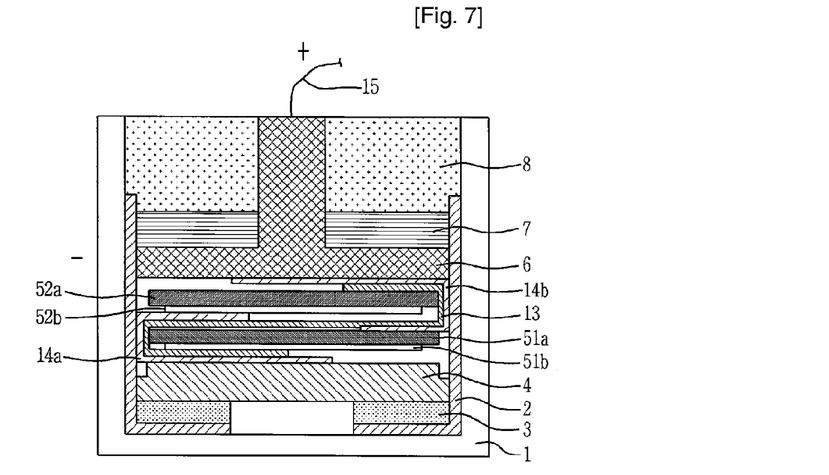
FIG. 7 is a cross-sectional view illustrating a structure of increasing the capacity of the reserve battery by connecting the unit cells of the all solid state thin film batteries in parallel in accordance with the present invention.

As illustrated in FIG. 7, in order to increase the capacity of the reserve battery having the all solid state thin film battery, two all solid state thin film batteries are connected in parallel in the structure of FIG. 1. The insulation coating 2 formed in the housing 1, the safety structure 4 and the switching system 3 are identical to those of FIG. 1. In the all solid state thin film batteries inserted into the housing 1, cathodes are positioned at the upper direction 51a and 52a and anodes are positioned at the lower direction 51*b* and 52*b*. The capacity of the reserve battery is increased by using a member 14*a* for contacting the anodes and a member 14*b* for contacting the cathodes, which are formed by depositing a metal thin film on both surfaces of an insulating film structure 13 or adhering a metal film to both surfaces thereof.

Figure 9:
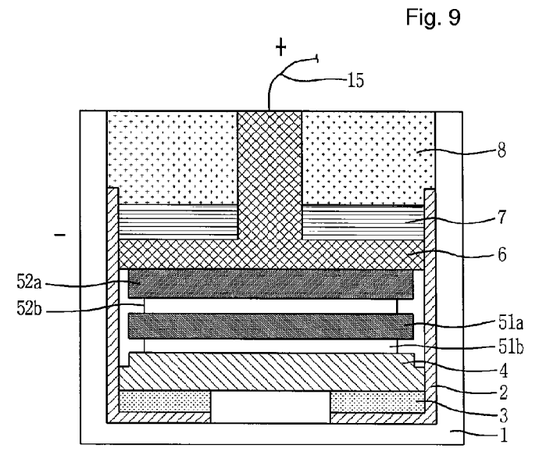
FIG. 9 is a cross-sectional view illustrating a structure of increasing the voltage of the reserve battery by connecting the all solid state thin film batteries in series in accordance with the present invention.

As depicted in FIG. 9, in order to increase the voltage of the reserve battery, two all solid state thin film batteries 5 are connected in series in the reserve battery of FIG. 1. In the all solid state thin film batteries 5 inserted into the housing 1, cathodes are positioned at the upper direction 51*a* and 52*a* and anodes are positioned at the lower direction 51*b* and 52*b*. The all solid state thin film batteries 5 are sequentially stacked and connected in series.

Figure 11:
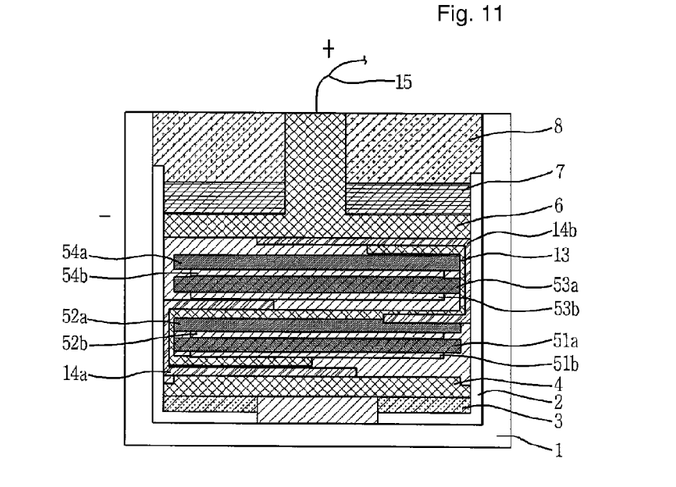
FIG. 11 is a cross-sectional view illustrating a structure of increasing the voltage and capacity of the reserve battery by connecting the all solid state thin film batteries in series and parallel in accordance with the present invention.

Referring to FIG. 11, in order to increase the voltage and capacity of the reserve battery having the all solid state thin film battery, modules 51*a*, 51*b*, 52*a* and 52*b*; 53*a*, 53*b*, 54*a* and 54*b* are formed in the structure of FIG. 1 by connecting four all solid state thin film batteries in series by two, and connected in parallel.

The insulating coating 2 formed in the housing 1, the safety structure 4 and the switching system 3 are identical to those of FIG. 1. In the case of the all solid state thin film batteries 5 inserted into the housing 1, in the bottom end module 51*a*, 51*b*, 52*a* and 52*b*, substrate parts are positioned at the upper direction 51*a* and 52*a* and anodes are positioned at the lower direction 51*b* and 52*b*, and in the top end module 53*a*, 53*b*, 54*a* and 54*b*, cathodes are positioned at the upper direction 53*a* and 54*a* and anodes are positioned at the lower direction 53*b* and 54*b*. Identically to the embodiment of FIG. 7, the capacity of the reserve battery is increased by using a member 14*a* for contacting the anodes and a member 14*b* for contacting the cathodes, which are formed by depositing a metal thin film on both surfaces of an insulating film structure 13 or adhering a metal film to both surfaces thereof for efficient parallel connection. That is, the capacity of the reserve battery having the all solid state thin film battery can be considerably improved by increasing the number of the parallel connections.

FIG. 3 is a typical view illustrating the activation process of the reserve battery having the all solid state thin film battery. In accordance with the present invention, the external stimulus is a sinking pressure. In the case that a predetermined pressure is applied to the closed surface of the housing 1 by the sinking type structure 16, the center of the closed surface of the housing 1 is caved to contact the safety structure 4. Accordingly, the battery is activated to supply power to an external electronic device. The pressure for activating the battery can be controlled by adjusting the thickness of the switching system 3.

Figure 5:
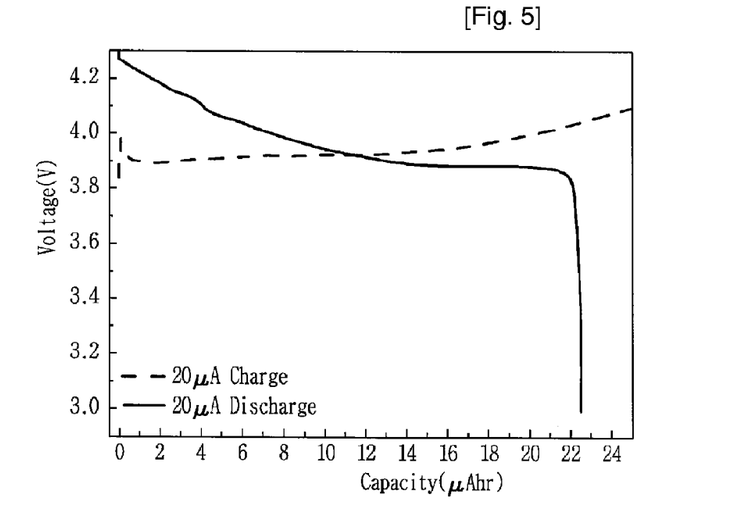
FIG. 5 is a graph showing a constant current charge/discharge experiment result of the unit cell of the all solid state thin film battery of the reserve battery in accordance with the present invention.

FIG. 5 shows a 20□ constant current charge/discharge experiment result of the all solid state thin film battery 5 disposed in the reserve battery. The effective area of the unit cell of the all solid state thin film battery 5 was 12.56 mm², and lithium cobalt oxide was deposited at a thickness of 2.7□ by sputtering as an cathode active material. Here, the solid electrolyte was LIPON, and the cathode thin film was metal lithium prepared by vacuum thermal deposition. In the 20□ constant current charge/discharge experiment, a typical charge/discharge curve of lithium cobalt oxide was obtained. The discharge capacity was 22.4 □h. That is, when it was presumed that the theoretical capacity of the lithium cobalt oxide thin film ($LiCoO_2$) was about 69 □h/cm²-□, the obtained discharge capacity was more excellent about 96% of the theoretical capacity of the lithium cobalt oxide cathode.

Figure 6:
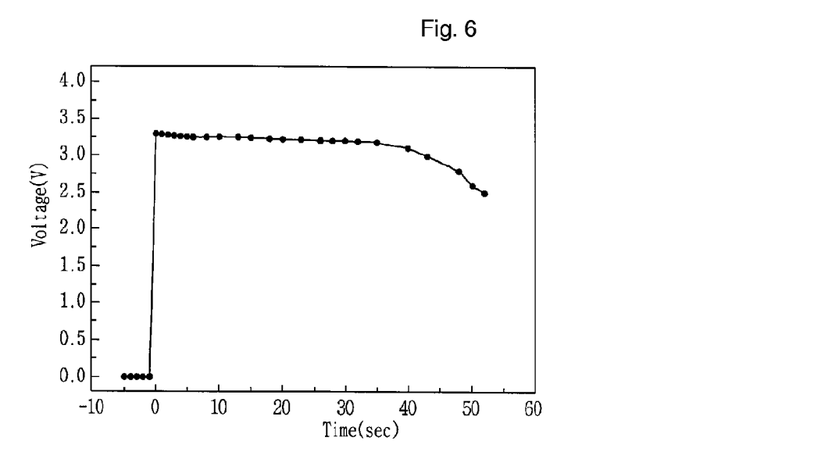
FIG. 6 is a graph showing an activation experiment result of the unit cell of the all solid state thin film battery of the reserve battery in accordance with the present invention.

FIG. 6 shows an experiment for activating the reserve battery having the one piece of all solid state thin film battery by an external force. When the battery was connected to the load having 10 kΩ, it has a voltage of 3.4V at the initial activated state. The reserve battery had a voltage of 3.4V. A very high current was applied to the battery, to discharge the battery in a short time. In addition, the response time was very short till activation of the battery. It took about 53 seconds to discharge the battery to 2.5V.

Figure 8:
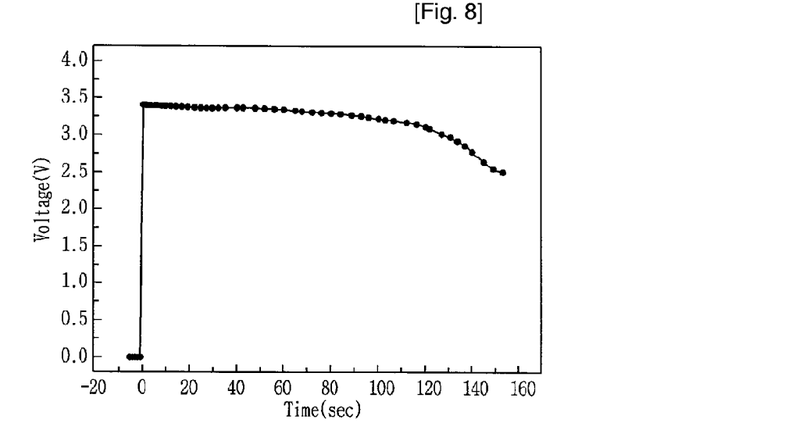
FIG. 8 is a graph showing an activation experiment result of the reserve battery in which the unit cells of the all solid state thin film batteries are connected in parallel in accordance with the present invention.

FIG. 8 shows an experiment for activating the reserve battery as in FIG. 3 by applying a predetermined pressure to the reserve battery of FIG. 7 (two cells were connected in parallel). The battery inactivated in the normal state received an external force and showed a voltage of 3.4V. That is, the battery was activated. It took about 150 seconds to discharge the battery to 2.5V. As compared with the result of FIG. 6 obtained by using one all solid state thin film battery, the discharge time was at least doubled. It was thus recognized that the capacity of the battery could be remarkably improved by increasing the number of the parallel connections of the all solid state thin film batteries.

Figure 10:
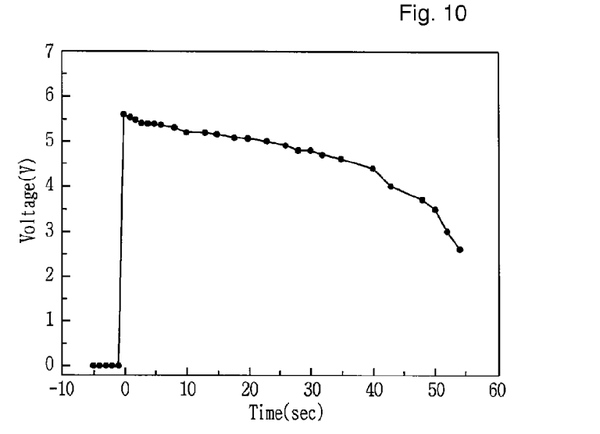
FIG. 10 is a graph showing an activation experiment result of the reserve battery in which the all solid state thin film batteries are connected in series in accordance with the present invention.

FIG. 10 shows an experiment for activating the reserve battery as in FIG. 3 by applying a predetermined pressure to the reserve battery of FIG. 9. The battery inactivated in the normal state received an external force and showed a voltage of 5.6V. That is, the battery was activated. As compared with the result of FIG. 6, the voltage of the reserve battery was increased by connecting two all solid state thin film batteries in series. As the time elapsed, the initial voltage of 5.6V was reduced with a pre-determined inclination, and then sharply reduced after about 40 seconds. Thus, it took about 54 seconds to discharge the battery to 2.5V.

Figure 12:
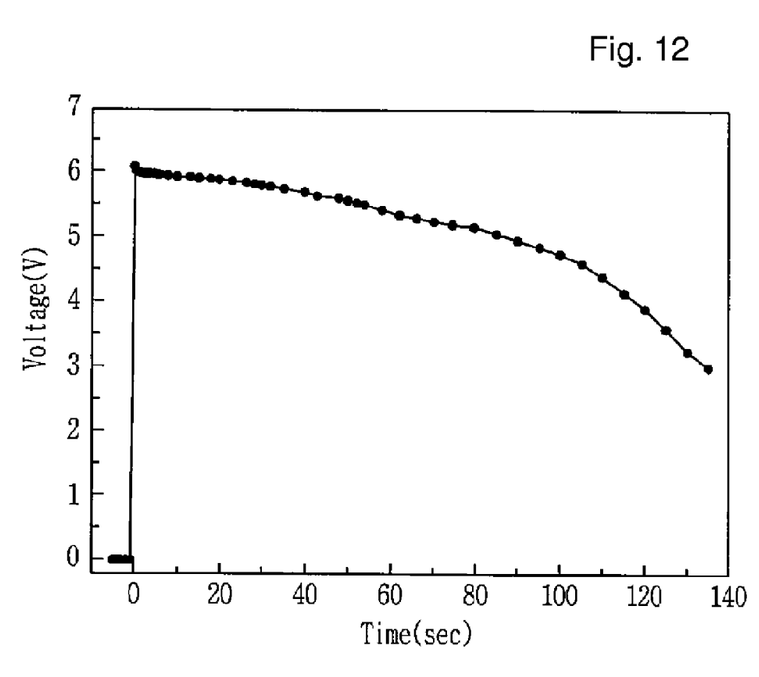
FIG. 12 is a graph showing an activation experiment result of the reserve battery in which the all solid state thin film batteries are connected in series and parallel in accordance with the present invention.

FIG. 12 shows an experiment for activating the reserve battery as in FIG. 3 by applying a predetermined pressure to the reserve battery of FIG. 11. The battery inactivated in the normal state received an external force and showed a voltage of 6V. That is, the battery was activated. As compared with the result of FIG. 10, the voltage manifestation time of the reserve battery was increased by connecting four all solid state thin film batteries in series and parallel. As the time elapsed, the initial voltage of 6V was reduced with a predetermined inclination, and then sharply reduced after about 100 seconds. Thus, it took about 135 seconds to discharge the battery to 3V.

In accordance with the present invention, the reserve battery having the all solid state thin film battery can be used as a fuse auxiliary power source or an emergency power source after long time preservation. In the case that the reserve battery is used as the fuse auxiliary power source, an inner surface of a housing made of copper having purity of at least 99.9% is partially coated with a thin insulating film (parylene: about 15□), for insulating a cathode (−) and an anode (+). Lithium is used as the anode of the all solid state thin film battery. Accordingly, in order to prevent moisture which intercepts long time preservation of lithium, the opened surface of the housing is molded by using a ceramic mixture of a resin material of magnesium silicate hydrated and epoxy resin and a hardener containing silica, magnesium silicate hydrate, diethylenetriamine and epoxy resin. A switching system is mounted inside, so that the battery can be operated only in use (percussion). The switching system is manufactured to contact only the anode area to maximize stability of the battery. That is, the surface of the switching system directly contacting the thin film battery is formed narrower than the opposite surface thereof with a step difference. In assembly, a predetermined pressure is applied from the upper direction, thereby stabilizing a battery contact state. When a sealing member is formed on the opened surface of the housing, the sealing member which seals up the housing protects the inside structure of the battery under the pressure in assembly and under the high speed and high rotation in use. In accordance with the present invention, the ultra-small and ultralight military battery which is not harmful to environment and which is operated in a section over 3.0V and a load of about 10 k for a short time (about 30 seconds) can be reliably preserved in a severe environment (−32 to 60° C.) for a long term (about 20 years). Also, the reserve battery minimizes self-discharge, has a high driving speed in operation (within 1 msec), and is stabilized under impact (about 30,000 G) and rotation (about 30,000 rpm).

Furthermore, the reserve battery can be preserved for an extended period of time and applied to a signal cracker and a model rocket which requires a fast response property in activation.

Although the preferred embodiments of the present invention have been described, it is understood that the present invention should not be limited to these preferred embodiments but various changes and modifications can be made by one skilled in the art within the spirit and scope of the present invention as hereinafter claimed.

The invention claimed is:

1. A reserve battery having an all solid state thin film battery, comprising:
   a housing made of a conductive material;
   an insulation coating formed on the inner surface of the housing;
   an all solid state thin film battery formed in the housing;
   a switching system disposed between the housing and the all solid state thin film battery; and
   an external terminal electrically connected to the all solid state thin film battery, for externally providing electrical connection through the opened surface of the housing,
   wherein the switching system is an insulator having a perforated center, and provides electrical connection between the housing and the all solid state thin film battery by a physical stimulus applied from the outside of the housing, and
   the part of the housing on which the insulation coating has not been formed is sunk by an external pressure, protruded to the perforated region of the switching system, and electrically connected to the thin film battery, thereby activating the reserve battery.

2. A reserve battery having an all solid state thin film battery, comprising:
   a housing made of a conductive material;
   an insulation coating formed on the inner surface of the housing;
   an all solid state thin film battery formed in the housing;
   a switching system disposed between the housing and the all solid state thin film battery; and
   an external terminal electrically connected to the all solid state thin film battery, for externally providing electrical connection through the opened surface of the housing,
   wherein the switching system is an insulator having a perforated center, and provides electrical connection between the housing and the all solid state thin film battery by a physical stimulus applied from the outside of the housing, and
   the switching system is formed in various thickness to decide the minimum external pressure for activating the reserve battery.

3. The reserve battery of claim 1, wherein the switching system further comprises an electrically conductive safety structure in a space with the all solid state thin film battery, for protecting the all solid state thin film battery from the physical stimulus applied to the housing.

4. The reserve battery of claim 3, wherein the safety structure further comprises an electrically conductive coating layer on its surface directly contacting an electrode of the all solid state thin film battery, for restricting reactivity with the contact electrode of the all solid state thin film battery.

5. The reserve battery of claim 1, further comprising a molding member for closing the opened surface of the housing on which the external terminal has been formed.

6. The reserve battery of claim 5, wherein the molding member is made of a material for preventing moisture and oxygen from mixing into the reserve battery.

7. The reserve battery of claim 6, further comprising a structure having a perforated center between the molding member and the external terminal.

8. The reserve battery of claim 1, further comprising a sealing member for sealing up the opened surface of the housing.

9. The reserve battery of claim 8, wherein the sealing member comprises an outer cap bonded to the housing, and a conductive inner cap adhered to the external terminal.

10. The reserve battery of claim 9, wherein the sealing member further comprises an insulating film between the outer cap and the inner cap.

11. The reserve battery of claim 9, wherein the outer cap is bonded to the housing by laser welding.

12. The reserve battery of claim 11, wherein the outer cap and the housing further comprise nickel plating for minimizing laser reflexibility.

13. The reserve battery of claim 9, wherein the outer cap and the housing are made of the same material.

14. The reserve battery of claim 9, wherein the inner cap is adhered to the external terminal by an electrically conductive adhesive.

15. The reserve battery of claim 14, wherein the inner cap has a minute hole on its upper direction, and further comprises a conductive wire inserted into the minute hole and compressed.

16. The reserve battery of claim 1, wherein the all solid state thin film battery comprises a substrate, a current collector deposited on the substrate, a cathode, a solid electrolyte and an anode, which are sequentially formed.

17. A reserve battery having an all solid state thin film battery, comprising:
   a housing made of a conductive material;
   an insulation coating formed on the inner surface of the housing;
   an all solid state thin film battery formed in the housing;
   a switching system disposed between the housing and the all solid state thin film battery; and
   an external terminal electrically connected to the all solid state thin film battery, for externally providing electrical connection through the opened surface of the housing,
   wherein the all solid state thin film battery comprises a substrate, a current collector deposited on the substrate, a cathode, a solid electrolyte and an anode, which are sequentially formed, and
   the all solid state thin film battery further comprises a thermal diffusion barrier film between the substrate and the current collector.

18. The reserve battery of claim 17, wherein the thermal diffusion barrier film is ITO.

19. The reserve battery of claim 17, wherein the thermal diffusion barrier film is cobalt.

20. The reserve battery of claim 1, comprising at least two all solid state thin film batteries in the housing,
   wherein the all solid state thin film batteries are connected in parallel.

21. The reserve battery of claim 20, wherein the all solid state thin film batteries are connected in parallel by an insulating film structure formed between the thin film batteries, a member for contacting cathodes, and a member for contacting anodes.

22. The reserve battery of claim 1, comprising at least two all solid state thin film batteries in the housing,
wherein the all solid state thin film batteries are connected in series.

23. The reserve battery of claim 22, wherein the all solid state thin film batteries are connected in series by being stacked in a certain direction so that anodes can be positioned at the lower direction and cathodes can be positioned at the upper direction.

24. The reserve battery of claim 1, comprising at least three all solid state thin film batteries in the housing,
wherein the all solid state thin film batteries are connected in series and parallel.

25. The reserve battery of claim 1, comprising at least two modules formed by stacking at least two all solid state thin film batteries in series in a certain direction so that anodes can be positioned at the lower direction and cathodes can be positioned at the upper direction,
wherein the modules are connected in parallel by an insulating film structure, a member for contacting cathodes, and a member for contacting anodes.

26. The reserve battery of claim 17, comprising at least two all solid state thin film batteries in the housing, wherein the all solid state thin film batteries are connected in parallel.

27. The reserve battery of claim 26, wherein the all solid state thin film batteries are connected in parallel by an insulating film structure formed between the thin film batteries, a member for contacting cathodes, and a member for contacting anodes.

28. The reserve battery of claim 17, comprising at least two all solid state thin film batteries in the housing,
wherein the all solid state thin film batteries are connected in series.

29. The reserve battery of claim 28, wherein the all solid state thin film batteries are connected in series by being laminated in a certain direction so that anodes can be positioned at the lower direction and cathodes can be positioned at the upper direction.

30. The reserve battery of claim 17, comprising at least three all solid state thin film batteries in the housing,
wherein the all solid state thin film batteries are connected in series and parallel.

31. The reserve battery of claim 17, comprising at least two modules formed by laminating at least two all solid state thin film batteries in series in a certain direction so that anodes can be positioned at the lower direction and cathodes can be positioned at the upper direction,
wherein the modules are connected in parallel by an insulating film structure, a member for contacting cathodes, and a member for contacting anodes.

* * * * *